United States Patent [19]
Ku

[11] Patent Number: 5,147,129
[45] Date of Patent: * Sep. 15, 1992

[54] AUTONOMOUS VISUAL-ATTRACTION ENHANCEMENT UTILIZING EDGE-ILLUMINATED PANEL

[75] Inventor: Ming-ho Ku, Kowloon, Hong Kong

[73] Assignee: Tradebest International Corporation, Hong Kong

[*] Notice: The portion of the term of this patent subsequent to Dec. 4, 2007 has been disclaimed.

[21] Appl. No.: 748,655

[22] Filed: Aug. 22, 1991

Related U.S. Application Data

[60] Continuation of Ser. No. 403,692, Sep. 6, 1989, abandoned, which is a division of Ser. No. 239,621, Sep. 1, 1988, Pat. No. 4,975,809, which is a continuation of Ser. No. 864,188, May 16, 1986, abandoned, which is a continuation-in-part of Ser. No. 773,184, Sep. 6, 1985, abandoned, which is a continuation-in-part of Ser. No. 594,209, Mar. 28, 1984, Pat. No. 4,559,583.

[51] Int. Cl.⁵ .............................................. F21L 15/14
[52] U.S. Cl. .................................... 362/106; 362/31; 362/812; 40/329
[58] Field of Search .................. 362/31, 32, 806, 812, 362/327, 103, 105, 106; 40/546, 627, 329

[56] References Cited

U.S. PATENT DOCUMENTS

| | | | |
|---|---|---|---|
| 2,095,558 | 10/1937 | Oberacker | 40/546 |
| 2,203,028 | 6/1940 | Parillo | 40/329 |
| 2,607,145 | 8/1952 | Pope | 362/812 |
| 2,699,553 | 1/1955 | Byers et al. | 40/329 |
| 4,009,535 | 3/1977 | Stock | 40/546 |
| 4,209,824 | 6/1980 | Kaufman | 40/124.1 |
| 4,286,399 | 9/1981 | Funahashi et al. | 40/124.1 |
| 4,667,274 | 5/1987 | Daniel | 362/106 |
| 4,901,211 | 2/1990 | Shen | 362/106 |
| 4,912,608 | 3/1990 | Lee | 362/806 |
| 4,975,809 | 12/1990 | Ku | 362/806 |

Primary Examiner—Ira S. Lazarus
Assistant Examiner—Sue Hagarman
Attorney, Agent, or Firm—Stetina and Brunda

[57] ABSTRACT

The visual attractiveness of a variety of otherwise-autonomous articles may be significantly enhanced through the inclusion of an apertured, internally light-transmissive, peripherally light-intrareflective panel which is edge-illuminated and energized by elements self-contained within the article body. Article apertures of distributed area, point size or both may be thusly illuminated. Distributed-area display effects may be enhanced through aperture-aligned light-concentrative discontinuities formed in the panel. Enhancement of point-display effects may similarly be achieved through point-aperture-aligned, light-concentrative point discontinuities likewise formed in the panel. Point effects may also be enhanced through the employment of an end-illuminated, aperture-aligned, point-discontinuous optical fiber in conjunction with a subject apertured panel. Bi-directional display effects in subject autonomous articles may be achieved by means of a layered panel having oppositely-projective surfaces. For realizations where increased article thickness is tolerable, color-variation effects may be achieved by the inclusion of an illuminating optical-fiber array whose input ends are themselves illuminated through a multicolored filter ring rotatably-interposed in front of an originating light source. Specific realizations of the present invention include greeting cards, key-chain medallions, campaign buttons, tree ornaments, dolls and picture-carrying plaques.

4 Claims, 12 Drawing Sheets

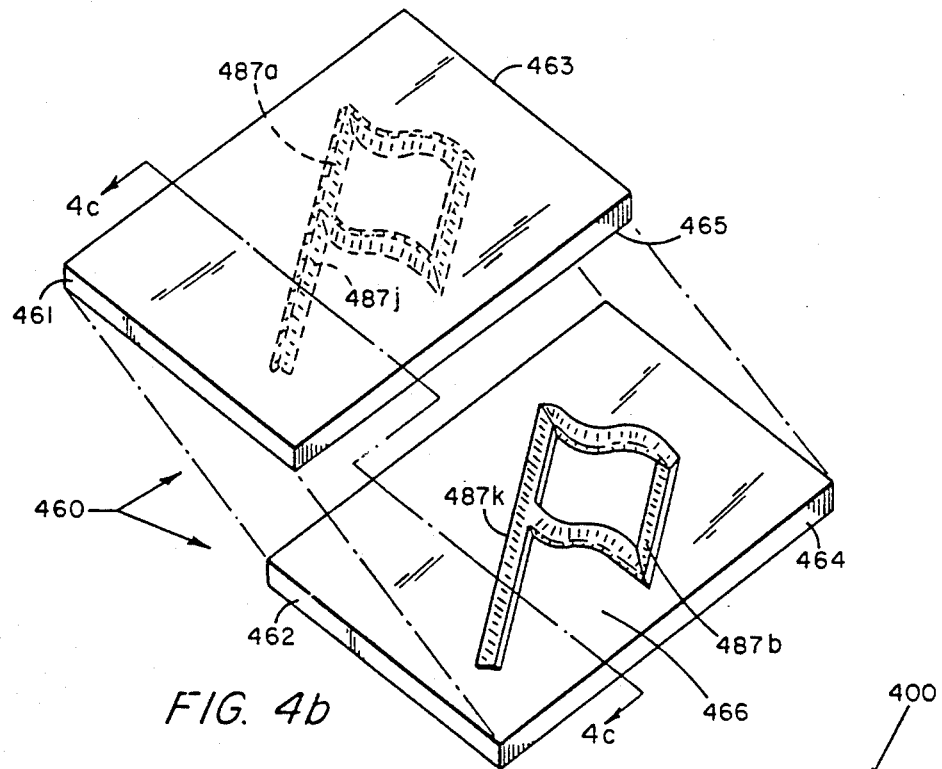
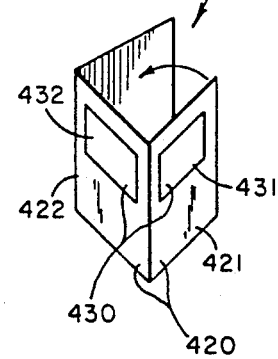
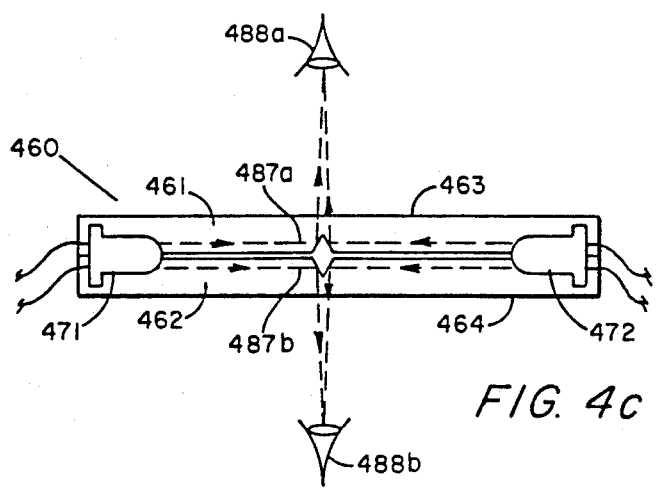

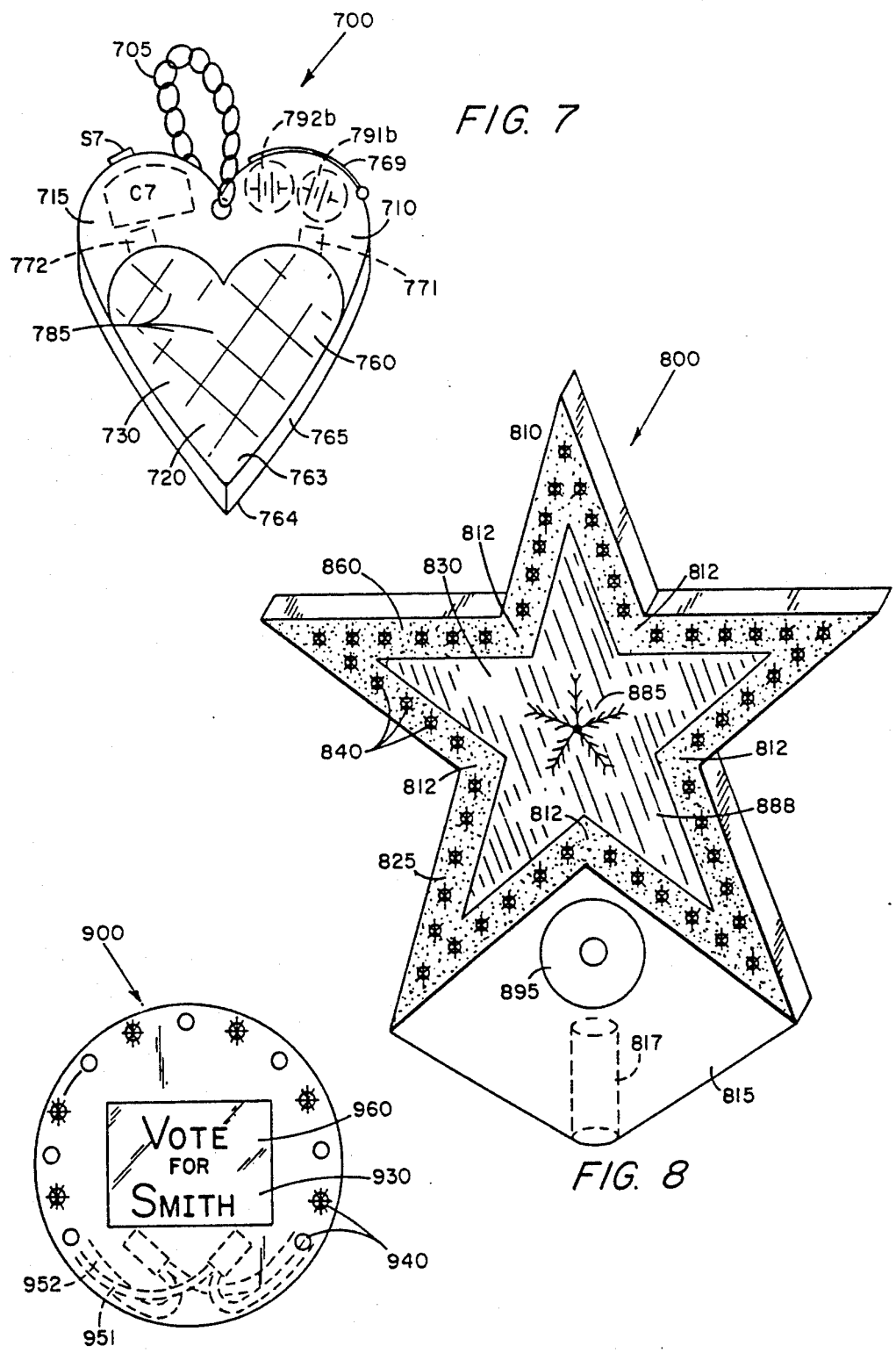

AUTONOMOUS VISUAL-ATTRACTION ENHANCEMENT UTILIZING EDGE-ILLUMINATED PANEL

CROSS-REFERENCE TO RELATED APPLICATIONS

This application is a continuation of application Ser. No. 07/403,692, filed Sep. 6, 1989, now abandoned a divisional of 07/239,621, Sep. 1, 1988, (U.S. Pat. No. 4,975,809) a continuation of 06/864,188, May 16, 1986, now abandoned a continuation in part of 06/773,184, Sep. 6, 1985, now abandoned a continuation in part of 06/594,209, Mar. 28, 1984 (U.S. Pat. No. 4,559,583).

BACKGROUND OF THE INVENTION

1. Field of the Invention

The invention relates in general to edge-illuminated devices and relates in particular to articles which employ edge-illuminated panels for visual-attraction enhancement. The invention has special relevance with respect to autonomous articles, such as greeting cards, medallions, dolls and plaques, where for practicality the illumination elements and energy sources must be article-self-contained.

It is to be noted, however, that while the subject invention will be described with reference to particularized embodiments and end uses, the invention is not limited to such embodiments and uses. Those having ordinary skill in the art and access to the teachings of this specification will recognize additional implementations and utilizations within the invention's scope.

2. Insights Regarding Background Art

The present invention has been motivated in significant part by the perception that the visual attractiveness of a great variety of otherwise-autonomous articles could be significantly enhanced through the inclusion of edge-illuminated display panels.

For example, although self-lighted greeting cards are known in the art, these prior cards have typically been limited to point-type lighting effects achieved by means of essentially point-type devices such as discrete LEDs. Card-based distributed lighting effects in particular apparently have previously been achieved only by means of distributed arrays of the discreted lighting devices. See, for example, U.S. Pat. Nos. 4,363,081, 4,286,399 and 4,209,824.

It has furthermore been more-generally perceived that although edge-illuminated panels have in fact been previously utilized in a variety of devices including those which are autonomously-energized, this usage has typically been limited to the production of background lighting effects for superposed transparencies or liquid-crystal displays. The employability and dramatic effectiveness of edge-illuminated panels as self-projecting display elements in autonomously-energized environments apparently has not previously been recognized. See, for example, U.S. Pat. Nos. 4,573,766, 4,555,694, 4,385,343 and 4,059,916 and Swemer, Gerry E., "Fiber Optic Futures", Part II, *Signs of the Times*, December, 1983, pages 38–41.

SUMMARY OF THE INVENTION

The limitations of the prior art are overcome by the present invention which in a first specific aspect provides a greeting card whose visual attractiveness is significantly enhanced through the incorporation of an apertured, internally light-transmissive, peripherally light-intrareflective essentially solid panel which is edge-illuminated and energized by elements self-contained within the card body. This first aspect of the invention further specifically provides card apertures of distributed area, point size or both which are to be thusly illuminated. Distributed-area display effects may be enhanced through aperture-aligned light-concentrative discontinuities formed in the panel. Enhancement of point-display effects may similarly be achieved through point-aperture-aligned, light-concentrative point discontinuities likewise formed in the panel. The first invention aspect still-further specifically provides that point effects may also be enhanced through the employment of an end-illuminated, aperture-aligned, point-discontinuous optical fiber in conjunction with a subject apertured panel.

The invention more-fundamentally provides for the attraction-enhancement of general autonomous articles through the analogous incorporation of panel, aperture, light-concentrative and optical-fiber concepts the same as those summarized above. The resultant fundamental display capabilities may be supplementally enhanced with bi-directional display effects achieved by means of a layered panel having oppositely-projective surfaces. For realizations where increased article thickness is tolerable, the generalized invention more-specifically provides in addition for the achievement of color-variation effects by the inclusion of an illuminating optical-fiber array whose input ends are themselves illuminated through a multicolored filter ring rotatably-interposed in front of an originating light source.

Further particularized aspects of the invention provide for the subject attractionally-enhancive panel and optical-fiber incorporation in such specific autonomous articles as key-chain medallions, campaign buttons, tree ornaments, dolls and picture-carrying plaques.

BRIEF DESCRIPTION OF THE DRAWINGS

FIG. 4a shows in spread perspective a further inventively-configured greeting card having an aperture which is itself specially configured for illuminated bi-directional viewability;

FIG. 4b shows in exploded perspective a subject panel configured for FIG.-4a-type bi-directional light projection by means of oppositely-directive discontinuities respectively composed of indentations formed into opposing back surfaces of panel-component dual layers;

FIG. 4c is a side sectional view of the FIG.-4b panel and shows the subject oppositely-directive discontinuities in their layer-superposed configuration, with associated edge-interposed light sources;

FIG. 5b is a side sectional view of the panel of FIG. 5a;

FIG. 7 shows a key-chain medallion inventively configured in correspondence with the distributed-area, edge-illuminated aperture concepts illustrated in the greeting card of FIG. 1;

FIG. 8 shows a tree ornament inventively configured in correspondence with the combined distributed-area and point-area aperture-illumination concepts illustrated in the greeting card of FIG. 2;

FIG. 9 shows a campaign button inventively configured in correspondence with the combined panel-distributed-area and fiber-point-area aperture-illumination concepts illustrated in the greeting card of FIG. 6;

DETAILED DESCRIPTION OF THE INVENTION

Figure 1:
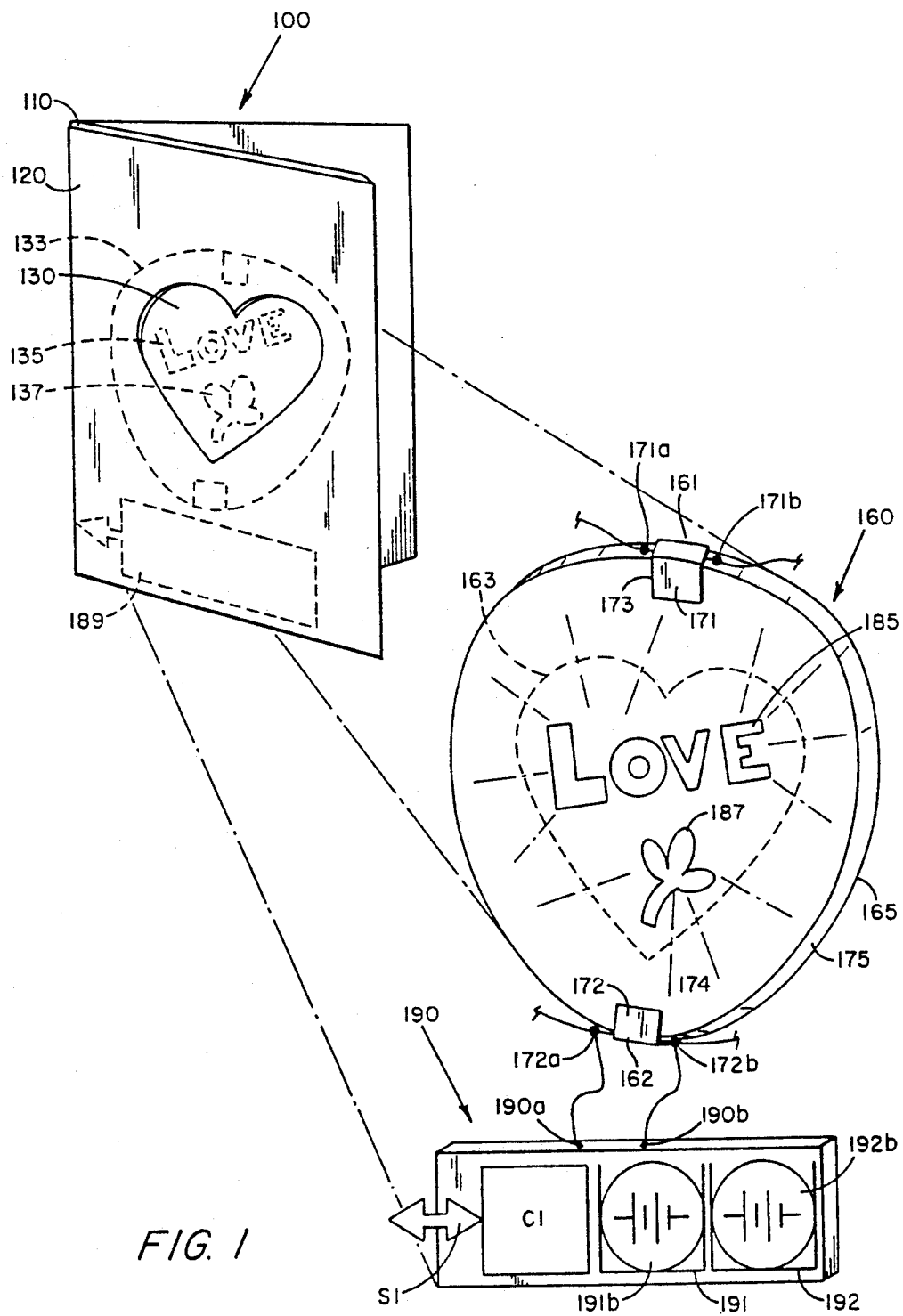
FIG. 1 is an exploded perspective view of an inventively-configured greeting card having a distributed-area aperture illuminated by a card-contained, edge-lit display panel which is driven by an also-contained control-and-energization assembly.

Beginning in FIG. 1, the visual attractiveness of an autonomous article such as greeting card 100 may be significantly enhanced through the incorporation of the panel-illuminated aperture concepts of the present invention. Card 100 thus includes an aperture 130 formed in display surface 120 of card body 110. Edge-lit panel 160 is then observably positioned at aperture 130 in the location indicated by outline 133. With the panel thusly positioned, the illuminated panel in general and the below-described indicia 185 and graphics 187 in particular become enhancedly visible, as for example at respective location outlines 135 and 137. Thus, the projection surface on the panel 160 and its patterns, indicia 185, and the graphics 187, are observable within the aperture upon appropriate positioning of the panel within the card body and fixed behind the display surface. The aperture can be either covered or uncovered as is desired. The autonomous nature of card 100 is preserved through the card-contained inclusion, at schematically-indicated location 189, of control-and-energization assembly 190 by means of which the panel is powered.

Panel 160 itself is internally light-transmissive essentially solid and may be of an otherwise-conventional composition, preferably a suitable lightweight clear plastic. Other appropriate materials include glass and crystal. The panel is edge-illuminated by means of view-concealed light emitting diodes (LED's) 171 and 172 appropriately embedded in the panel side-periphery 165. It will be apparent that other types of light sources, such as miniature incandescent light bulbs, may also be employed for the subject edge-embedded illumination. It will also be apparent that the essentially-statically-displayed color of the resultantly-illuminated panel will be a selectable function of such considerations as LED type, incandescent bulb color and intra-panel compositional pigmentation. Example subsystems for achieving dynamic variation of displayed color will be discussed subsequently in conjunction with the embodiments of FIGS. 11 and 12.

Illumination uniformity within panel 160 is improved to a certain extent by employing the plurality of the two LED's positioned as shown at opposite ends 161 and 162 of the panel. Illumination efficiency is analogously improved to a certain extent by covering the respective LED's with reflective metalized tape segments 173 and 174 which prevent the escape of light energy from those panel portions which immediately surround the LED's. Of far greater effectiveness for both illumination efficiency and illumination uniformity is the reflective coating 175 which preferably covers substantially all otherwise-uncovered portions of side-periphery 165, thereby rendering the panel peripherally light-intrareflective. It has been found, in fact, that especially in view of the inherently-limited nature of the energy sources self-carryable by card 100, as well as in view of the associatedly number-limited and hence necessarily non-uniformly-distributed nature of input lighting sources employable, such peripheral intrareflectivity contributes significantly to the achievement of uniform display effects of adequate brightness in subject smallerscale autonomous articles. Coating 175 may be of conventional composition such as a suitable metalized layer or even reflective tape of the same basic nature as that employed for segments 173 and 174.

LED's 171 and 172 receive electrical energy through suitable, partially-shown connections between their various terminals 171a, 171b, 172a and 172b and the terminals 190a and 190b of control-and-energization assembly 190. Schematically-represented assembly 190 includes suitable connection-receptacles 191 and 192 for similarly-suitable energy sources, such as removably-replaceable disc batteries 191b and 192b, which supply energy to the panel LED's under the control of a suitable control unit C1. Unit C1 may itself be constructed in integrated-circuit form. It may parenthetically be noted that the described LED's, their associated connections and assembly 190 with its battery receptacles and unit C1 may together be more-formally regarded as a card-body self-contained network for edge-illuminating panel 160. The desired illumination functions of this network may then in turn be formally regarded as being operationally effectable upon an actual interpositioning within the subject receptacles of the referenced energy sources themselves.

Unit C1 is preferably configured to become activated by an appropriate switching mechanism S1, such as one which is itself activated in conjunction with the opening and closing of the card body. Unit C1 may in itself also include suitable elements for effecting such specialized display effects as light blinking.

With regard now to the mechanisms by means of which actually-viewed display effects are produced, card 100 is in general configured to include suitable expedients, disposed so as to be illuminated by a certain portion of the light energy applied to the edges of panel 160, for causing a further portion of this expedient-incident energy to be projected transversely away from the panel and out through aperture 130 toward a display viewer. Such expedients may take several forms, including a layer of reflective material applied to the back surface of the panel. Preferably, however, the expedients take the form of light-path-alterative material-discontinuities formed into the panel itself. Such discontinuities may themselves take a number of forms, several of which will be exemplified by various ones of the present figure-illustrated embodiments.

The panel-intraformed discontinuities of the embodiment of FIG. 1 are of a form whose basic principles will be subsequently described in greater detail in conjunction with the embodiment of FIG. 4. Briefly, the FIG.-1 discontinuities entail indentational grooves formed into the back, off-aperture surface of panel 160. The subject grooves, which may for example be obtained secondarily by a post-molding etching or more-directly through the use of reverse-indentation molds, are shown to have been configured into linguistic pattern 185 and pictorial, and specifically floral, pattern 187. Light originating at LED's 171 and 172 and incident upon back-surface patterns 185 and 187 is directed outward through aperture 130 which assumes the disposition indicated by outline 163 when panel 160 is appropriately positioned within card 100. It may be noted that although panel 160 may be supplemented with other types of transverse-projection expedients such as the referenced specially-reflective backing sheet or a generalized front-projective roughening of the panel's back surface, very good display effects have been achieved in actual embodiments containing only the described grooved discontinuities. It is in particular contrast with the generalized projection produced by a subject surface roughening that the described discontinuities may furthermore be noted to have a light-concentrating effect resulting in especially-pronounced display vividness. It may conjunctively be noted that although backing sheets are not essential to display effectiveness, appropriate types of such sheets may be advantageously employed for such secondary purposes as the creation of color contrasts or the provision of background imagery, especially considering the often-transparent nature of panel 160. Additional considerations regarding the use of such supplemental, and typically surface-borne, materials for display-augmentation purposes will be discussed in conjunction with the embodiments of FIGS. 4d and 10a.

It may now be observed that a greeting card configured in accordance with the panel-illuminated concepts discussed above is capable of an illuminationally-enhanced conveyance of meaning not only linguistically and pictorially but also symbolically, with panel-borne formations and aperture shape each being available for such linguistic, pictorial and symbolic representations. It is in particular contrast with the point-aperture display effects to which prior-art greeting cards were limited that the remarkableness of the present inventive distributed-area display capabilities becomes most apparent. Aperture 130 is thus illustrative of the fundamental situation in which the subject distributed-area capabilities are employed for attractionally-enhancive illumination within a distributed-area aperture.

At the same time, however, point-aperture effects are not only still achievable with the present invention but may also be realized in unique, distributed-array form. The embodiment of FIG. 2 is illustrative of a situation of this nature.

Figure 2:
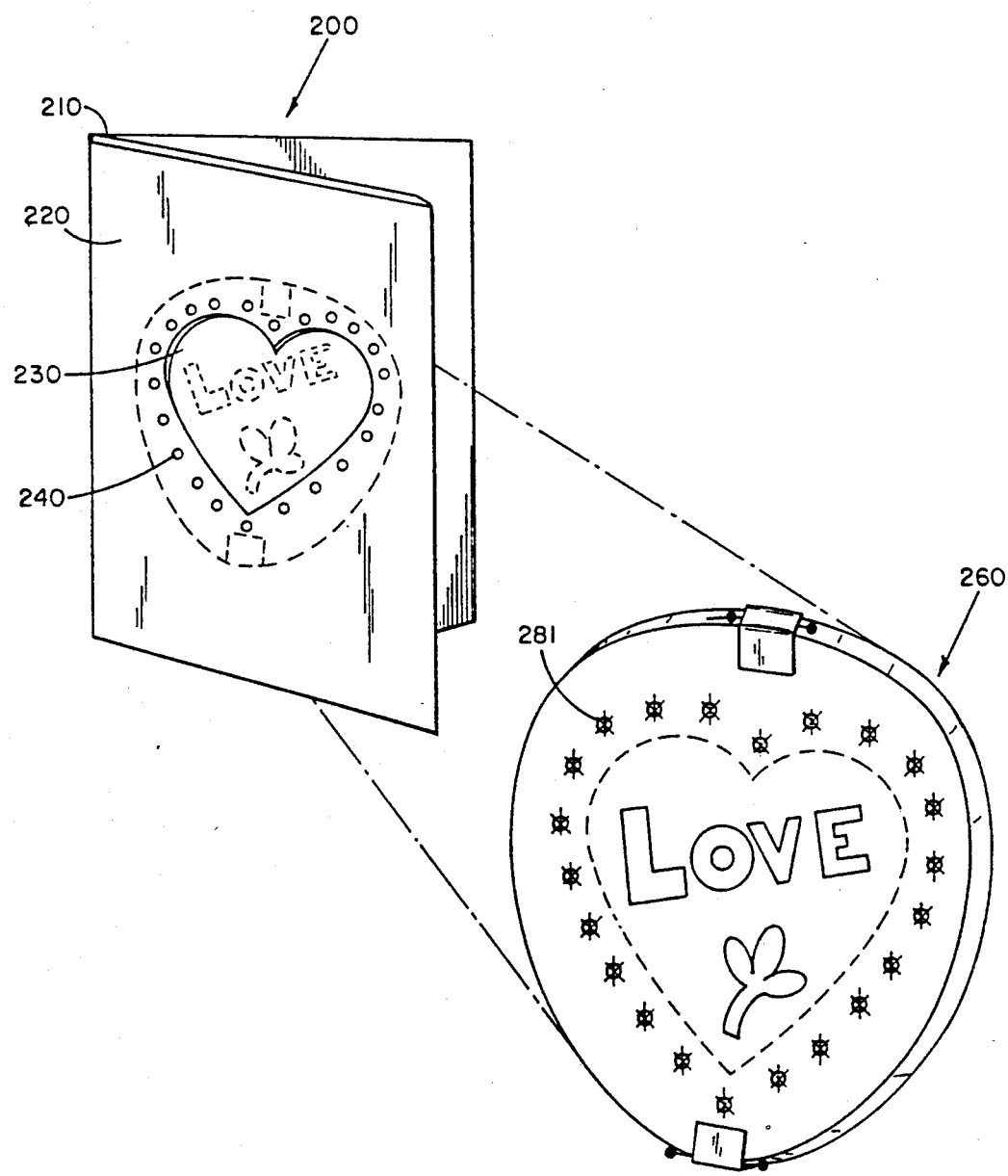
FIG. 2 is an exploded perspective view of another inventively-configured greeting card having both distributed-area and point apertures, with both aperture-types being illuminated by an edge-lit display panel which includes point discontinuities for point-aperture light concentration.

Because basic elements of the FIG.-2 embodiment are in essence the same as those of the FIG.-1 embodiment, the present discussion will tend to focus on the aspects of FIG. 2 which differ from those of FIG. 1. Thus in addition to distributed-area aperture 230, display surface 220 of card 200 includes at least one point aperture 240 which upon appropriate positioning of panel 260 becomes illuminated by transverse light projection from a predeterminable portion of the panel. Panel 260 preferably carries at least one point-aperture-correspondent point discontinuity 281 configured, in functional correspondence with the light-concentrative grooves 185 and 187 of FIG. 1, so as to effect a subject transverse projection which is pointwise-concentrated. An expedient such as an essentially-conical indentation in the panel's back surface may be employed for this purpose. It can be seen that card body 210 and panel 260 have been conjunctively provided with a coordinated plurality of the subject point apertures and point discontinuities, to advantageous, concentrated-array effect.

Figure 3A:
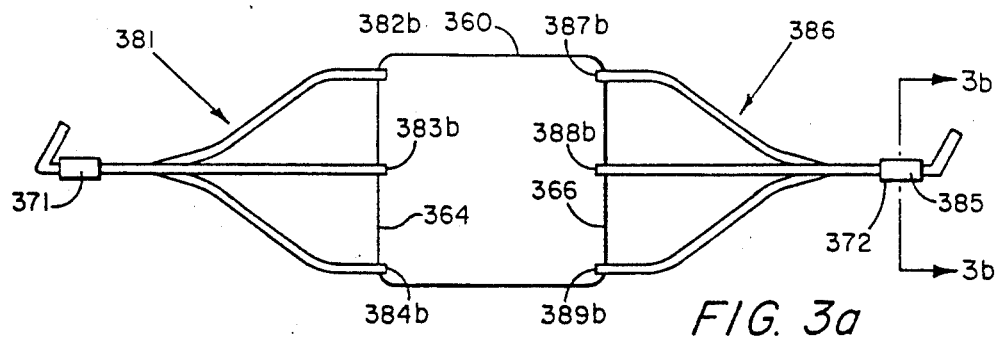
FIG. 3a represents a subject autonomously-carriable display panel edge-illuminated by an end-embedded plurality of optical fibers.
Figure 3B:
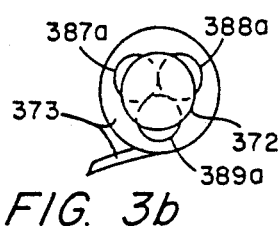
FIG. 3b illustrates the input end of a FIG.-3a optical-fiber cluster which is itself end-illuminated by an axially-juxtaposed discrete lighting source.

FIG. 3a illustrates an alternative arrangement for the edge-illumination of a subject display panel. Instead of two light sources such as view-concealed LED's 371 and 372 being themselves directly embedded in the edges of panel 360, the LED light is first injected into the input ends of respective optical-fiber clusters 381 and 386 whose output ends 382b, 383b and 384b and 387b, 388b and 389b are embedded, at a separated plurality of positions, into the opposite sides 364 and 366 of the panel. Thus although the FIG.-3a arrangement, like the FIG.-1 arrangement, must still be characterized as one which with respect to panel planar geometry is of non-uniform input light distribution, a net improvement in this distribution is still achieved. FIG. 3b is an end-on sectional view taken into plane 3b—3b at cluster-LED interface 385 and schematically illustrates the manner in which LED 372 is axially juxtaposed the cluster input ends 387a, 388a and 389a. In order to reduce the loss of transferred light energy, interface 385 includes a suitable internally-reflective covering such as metalized tape segment 373.

FIGS. 4a, 4b and 4c in general illustrate the basic manner in which bi-directional display effects may be achieved in the context of the edge-illuminated panel concepts of the present invention. FIGS. 4b and 4c also more-particularly illustrate basic aspects of the means by which the transversely-projective and light-concentrative effects of various present embodiments are conveniently realized. FIG. 4a thus shows in spread perspective a greeting card 400 having a composite display surface 420 specially configured for bi-directional viewability. Composite surface 420 includes oppositely-oriented first and second component-display-surfaces 421 and 422. Respectively formed into these first and second surfaces are the individual first and second component-apertures 431 and 432 which in the illustrated embodiment are alignedly configured so as to together form a composite bi-directional aperture 430.

Companionly configured for bi-directionally-observable interpositioning at aperture 430 is the composite display panel 460 shown in the exploded view of FIG. 4b. Panel 460 includes the first and second component-layers 461 and 462 respectively having the associated, oppositely-oriented exterior projection surfaces 463 and 464. Respectively formed into layers 461 and 462 are the projective discontinuity patterns 487a and 487b. In order to effect the desired bi-directional projection, and as will be further discussed in conjunction with FIG. 4c, the respective patterns oppositely project incident light energy out through the opposing projection surfaces 463 and 464. This objective may preferably be achieved by causing patterns 487a and 487b to again take the form of indentational grooves, here respectively oppositely formed into opposing interior surfaces 465 and 466. As viewed in FIG. 4b, pattern 487a thus entails an indentation upward into back surface 465 while complementary pattern 487b entails an indentation downward into back surface 466.

It may parenthetically be noted that because of the conveniently-transparent nature of the respective layers, typical types of discontinuity patterns in a given one of the layers will be observable through the other opposing layer. For dual-layer panels of the present bi-directionally-viewable variety, therefore, it becomes preferable to employ patterns of a congruently-aligned nature. In addition, the associated pattern reversal when viewing the panel from opposite directions may as well result in a preference for patterns which are also of a non-linguistic nature. The example patterns of FIG. 4b thus together form a unitary, bi-directional-viewable flag.

The resultantly-associated bi-directional light-projection action is illustrated in the side-sectional view of FIG. 4c which shows example panel 460 as layer-superpositonally assembled. LED light sources 471 and 472 have been included not only for the sake of pedagogic convenience but also to schematically illustrate the manner in which edge-illumination elements may be rendered mechanically secure through an enclosed edge-embeddedment. Readily-apparent from the Figure is the bi-directional manner in which the oppositely-formed discontinuites 487a and 487b respectively cause incident light from the edge-disposed sources to be projected primarily out toward the associated one of the opposing view positions 488a and 488b.

Several additional consideration regarding the subject discontinuities in general may be supplementally noted. First, the reference light-concentrative effects would appear to result from the action of the sloped discontinuity surfaces in locally deflecting a relatively-large amount of light energy out toward a given view position. In addition secondly to the employment of the discussed indentational grooves, deflectionally-operative discontinuities may also be achieved by an appropriate juxtaposition of suitable, optically-dissimilar materials within a given panel substrate. It has been found thirdly that illumination uniformity within a given discontinuity is often improved when the associated interface surfaces, such as groove facial surfaces 487j and 487k in FIG. 4b, are effectively at least somewhat roughened. Finally, the dynamic projective-display impact of a given discontinuity in itself may be generally further enhanced by including, as for example in coated form on given interface-groove surfaces, such other materials as those which are affirmatively-reflective, color-filtrational or both. Sparkle effects of even a multicolor variety may thereby be achieved, especially when the subject reflective material is minutely-multifaceted.

Figure 4D:
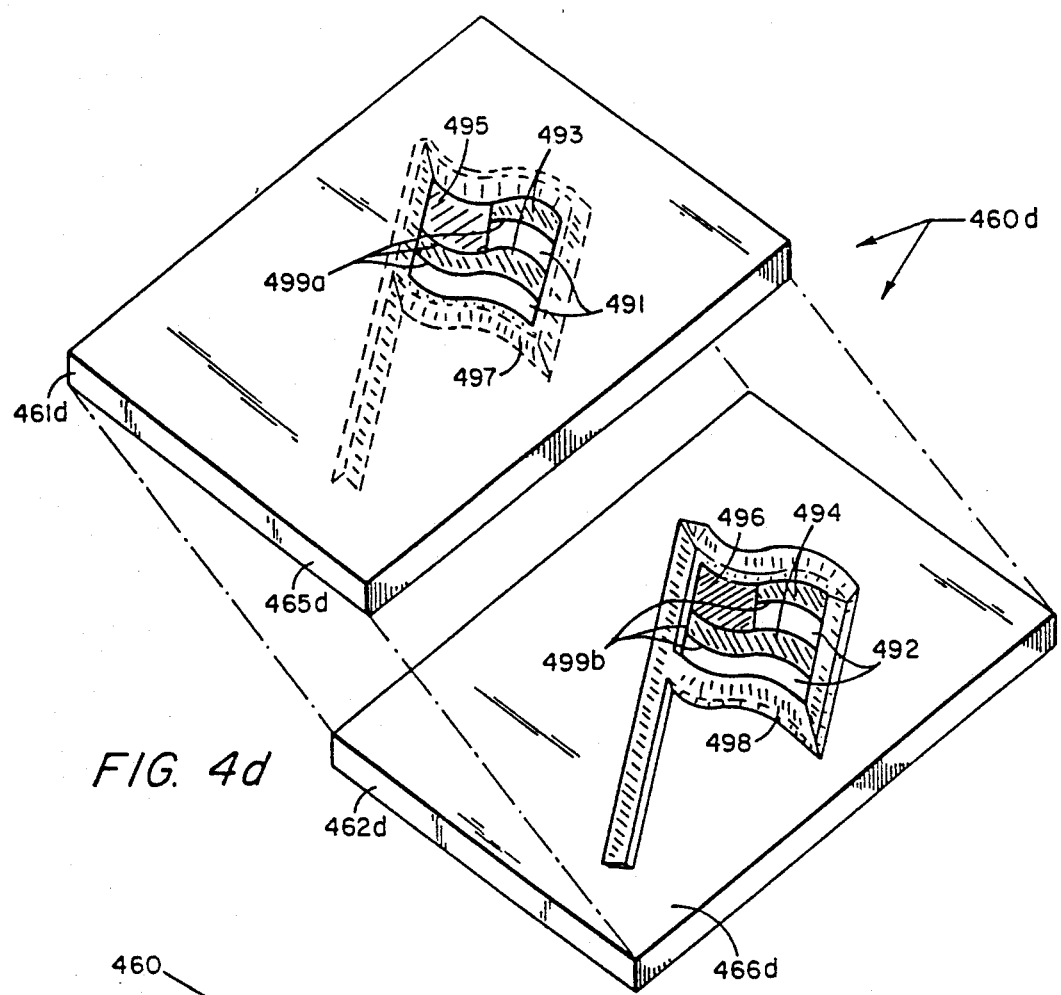
FIG. 4d shows in exploded perspective another subject dual-layer panel which here includes supplemental materials, such as metallic foils or silk-screened pigments, configured over selected portions of the panel surfaces so as to create imagery which is both statically viewable in the absence of edge illumination and dynamically highlighted in the incident presence of such illumination upon coordinatedly-surrounding discontinuity patterns.

In partial contrast with this use of supplemental materials on the discontinuity surfaces themselves, and as a special case of the generalized backing sheets discussed previously in conjunction with the embodiment of FIG. 1, the embodiment of FIG. 4d illustrates an example manner in which subject supplemental materials, such as metallic foils or silk-screened pigments, may be configured over selected portions of the panel surfaces so as to create imagery which is both statically viewable in the absence of edge illumination and dynamically highlighted in the incident presence of such illumination upon coordinatedly-surrounding discontinuity patterns. The component layers 461d and 462d of composite panel 460d thus respectively carry silver foil segments 491 and 492, red foil segments 493 and 494, and silk-screened blue pigment coatings 495 and 496. The resultant respective foil-and-pigment ensembles form static representations of a multi-colored flag which as desired remains directly viewable even without associated edge illumination. However, by being respectively disposed within the flag-shaped boundary outlines formed by discontinuity patterns 497 and 498, the foil-and-pigment representations as also desired become dynamically highlighted in the discontinuity-incident presence of the subject illumination. It may be noted that for the sake of use-inaccessible mechanical integrity in the illustrated case of a dual-layer panel, the here-subject materials are preferably carried in particular by the respective interior layer-surfaces 465d and 466d. It is similarly apparent that such materials may be molded into the interior of a single panel layer. It may also be noted that the subject highlighting is not limited to image boundaries, and may for example include intra-image discontinuities such as curvilinear indentations which would coincide with separation lines 499a and 499b between the flag stripes. Other example discontinuities disposed for illumination purposes within the interior of an image which is at least partially formed with materials of the present supplemental type will be described in conjunction with the embodiment of FIG. 10b.

Figure 4E:
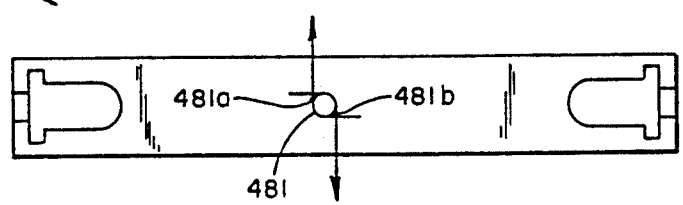
FIG. 4e is a side sectional view of a subject panel also configured for FIG.-4a-type bi-directional light projection, here by means of oppositely-directive discontinuities respectively composed of opposing portions of a three-dimensional cavity formed within the interior of a single panel layer.

Before proceeding with a discussion of other display effects achievable with plural-layer panels, it may be noted with parenthetic regard to FIG. 4e bi-directional light projection suitable for FIG.-4a-type purposes may be achieved by means of a three-dimensional cavity formed within the interior of a single panel layer. Thus within the single-layered panel 460e, opposing boundary portions 481a and 481b of cavity 481 effectively become oppositely-directive discontinuities which cause incident edge-injected light to again be projected, as indicated, out toward opposing view positions. It will be apparent that remaining cavity-boundary portions likewise produce companion opposite-projection action. It may also be noted that a cavity of the present type may be regarded as a specialized case of the previously-referenced intra-layer juxtaposition of optically-dissimilar materials, such as two plastics of different refractive indices, for general light-projection purposes. It thus follows that the subject bi-directionality may similarly more-generally be achieved by including within a given panel layer suitable oppositely-directive configuration of such dissimilar materials.

Figure 4F:
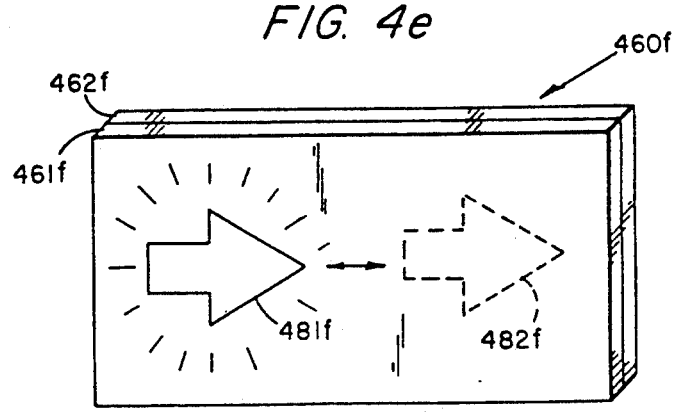
FIG. 4f illustrates an image-motion effect achievable by means of image-coordinated discontinuity patterns non-congruently distributed among alternately-illuminated layers of a subject multiple-layer panel.

FIG. 4f illustrates an image-motion effect achievable by means of image-coordinated discontinuity patterns non-congruently distributed among alternately-illuminated layers of a subject multiple-layer panel. The layers 461f and 462f of composite panel 460f thus respectively include the coordinated discontinuity patterns 481f and 482f which are here configured as arrows. As viewed, arrow 481f is formed in the left half of the front layer 461f while arrow 482f is formed in the right half of the back layer 462f. It may be parenthetically noted that while the individual arrows and hence the overall panel may be suitably configured for either uni-directional or bi-directional projection, the presently-described example motion effects require that both arrows be co-directionally projective on at least one side of the subject panel.

With the subject layers independently illuminated by appropriate edge-disposed light sources not explicitly shown, the respective arrows accordingly basically become independently illuminated only when the associated layer is itself illuminated. Under the suitable alternated direction of an unillustrated controller, a cyclically-alternated illumiunation of the respective layers induces an associated cyclically-alternated illumination of the likewise-associated arrows, which by virtue of their illustrated non-congruent disposition produces an apparent repeated arrow motion from left to right. It will be evident that analogous effects with corresponding types of imagery, such as the side-to-side waving of a hand, are also readily achievable. It may be supplementally noted that in order to attenuate any typically-minimal secondary illumination of a subject discontinuity pattern in a layer other than that directly illuminated at a given instant, such as for example by stray light entering and propagating wihtin front panel 461f upon forward light-projection from back-panel pattern 482f, the respective layers may be provided with front-surface coatings, such as suitable, darkend light-filtration films, which operate to block such secondary illumination while being transmissively overcome by the projections from direct primary illumination.

Figure 5A:
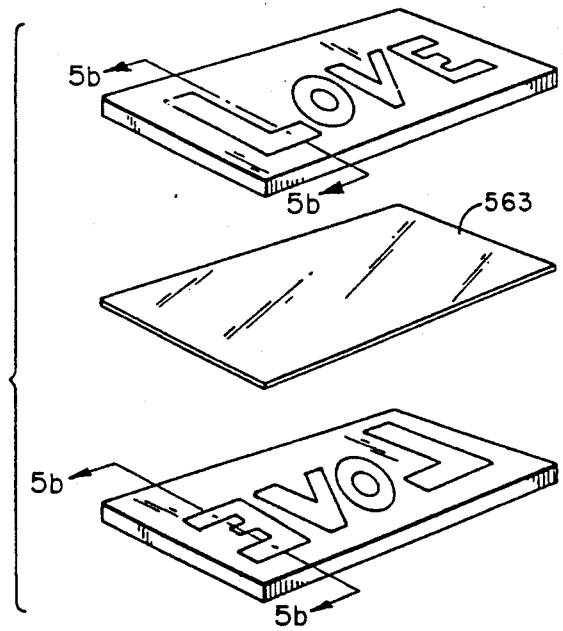
FIG. 5a is an exploded perspective view of a subject layered panel configured for bi-directional readability by means of a translucent intermediate layer which is light-conductive while preventing direct through-panel viewability of non-symmetrically superposed graphics.
Figure 5B:
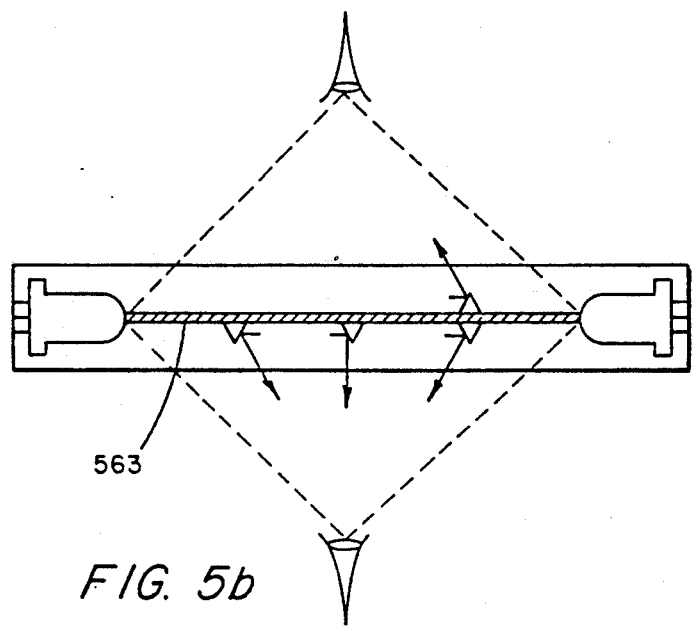

In contrast now with the dual-layer panel of FIGS. 4b and 4c in which through-panel viewability tends in situations of simultaneous layer illumination to preclude the use of discontinuity patterns which are not congruently view-symmetric, the inclusion in FIGS. 5a and 5b of an intervening, generally-translucent layer 563 makes ordinary legibility possible in subject bi-directional projection environments even when desired linguistic or other types of discontinuity patterns lack superpositional symmetry. FIG. 5b in particluar schematically indicates the manner in which layer 563, while typically allowing the general passage of light energy, tends to inhibit an undesired viewability of inconsistent projection patterns in an opposing layer. It is supplementally apparent that a generally-opaque intervening material may alternatively be employed where a total blockage of light is desired in addition to the subject opposing-layer view-inhibition. Also, the present intermediate layer may in any event be employed as a mounting surface for the previously-discussed supplemental materials.

Figure 6:
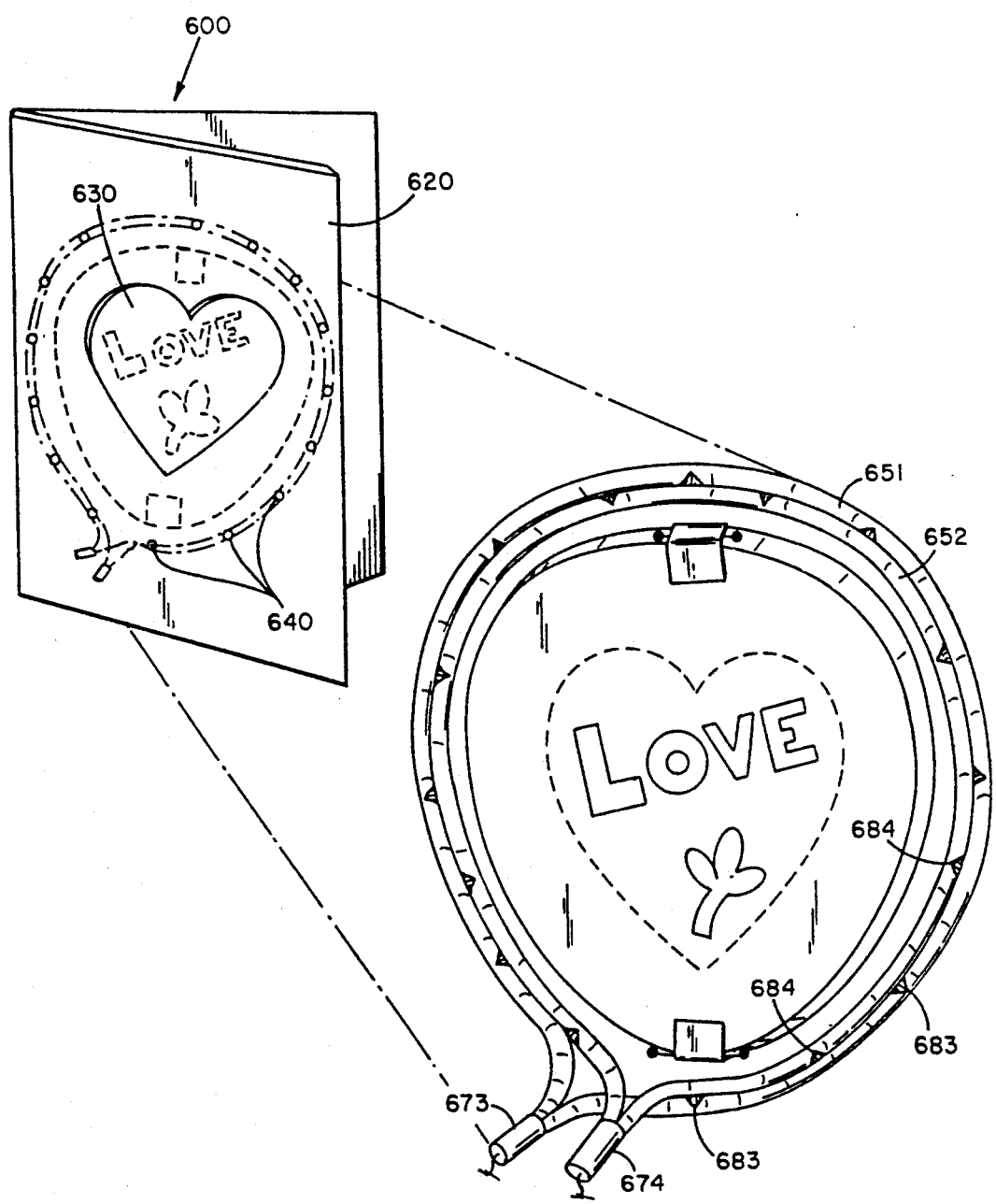
FIG. 6 is an exploded perspective view of yet another inventively-configured greeting card again having both distributed-area and point apertures, but with a subject panel being employed only for the distributed-area illumination while a looped pair of optical fibers having point discontinuities as taught by the parent cases is conjunctively utilized for the point-aperture light concentration.

FIG. 6 illustrates a greeting card in which the distributed-display capabilities of a subject edge-illuminated panel are combined with the pointwise-discontinous optical-fiber teachings of the incorporated prior cases. The net result is an arrangement alternative to that of FIG. 2 for the illumination of both distributed-area and point greeting-card apertures. As with the discussion of FIG. 2, the present description will focus primarily on those aspects of the FIG.-6 configuration which differ from those of the previous figures.

Greeting card 600 thus again includes both a distributed-area aperture 630 and preferably a plurality of the point aperatures 640. In contrast with the FIG.-2 embodiment, however, the point apertures are illuminated by means of one or more lengths of optical fiber, preferably the looped pair of fibers 651 and 652. Ther respective fibers are end-illuminated by reflectively view-concealed LED's 673 and 674. As taught by the prior cases, each fiber loop carries the preferred plurality of intraformed point discontinuities, conveniently incisions 683 and 684, for effecting a pointwise-concentrated fiber-transverse projection, through an associatedly-aligned point aperture, of discontinuity-incident light energy. The present LED's may again be preferably powered by controlled energy from an unillustrated assembly such as one which corresponds to subsystem 190 of FIG. 1. In contrast this time with the FIG.-1 arrangement, however, a control unit for the present system may preferably be configured not only for a blinking-type switching of the light energy applied to the respective fiber loops, but for a loop-alternated blinking. With the discontinuities on a given loop being formed, as illustrated, so as to coincide with alternate ones of the subject point apertures, and with the respective loops being mutually configured, as also illustrated, for coincidence with different sets of alternate apertures, the reference loop-alternated blinking produces a shifting-point-ensemble illumination effect at display surface 620.

It will be supplementally apparent that the concepts of the FIG.-2 embodiment may be combined with those of the FIG.-6 embodiment, just as the discussed cosncepts regarding discontinuity formation in subject panels may be applied as well to the formation of subject fiber discontinuities. It will be conjunctively apparent that in general the concepts of all the embodiments of the present and incorporated cases may be variously interchanged and intercombined.

In particular, FIG. 7, 8, 9, 10a and 10b illustrate example ways in which a number of the above-discussed concepts may be employed to more-generally produce autonomous, attractionally-enhanced articles of other-than-greeting-card varieties. These additional embodiments will now be described, with the discussion again tending to focus on those considerations which are unique to a given embodiment.

As an example application in part of a number of the panel-distributed-area concepts of the embodiment of FIG. 1, FIG. 7 thus illustrates a key-chain medallion 700 having a key chain 705 and a medallion body 710, of which edge-illuminated display panel 760 effectively forms an integral part. Panel 760 conveniently extends the full width of body 710 and is as a more-particular consequence well-suited in addition for bi-directional display-effects generation. With its peripherally intra-reflective coating 765, panel 760 itself also effectively helps to define, bi-directionally, medallion display surface 720 and the associated distributed-area display aperture 730. Parenthetically, the as-presently-used concept of a display aperture thus more-generally signifies a bounded area for a subject illuminated display. Edge-disposed lighting sources 771 and 772 are advantageously positioned essentially as shown for improved illumination effectiveness. Body 710 again self-containedly includes, here within typically-opaque top-section 715, appropriately-configured energy-source batteries 791b and 792b, as well as its own control unit C7. Section 715 also conveniently carries both externally-accessible ON/OFF switching mechanism S7 and hinged battery-access cover 769.

It is to be noted parenthetically that panel 760, by virtue of its described display-surface and display-aperture definitional attributes, may be regarded as a special case of a more-general, and still invention-encompassed, situation in which the subject surface-definition and aperture-definition functions are performed essentially solely by a subject panel having basically only immediately-associated peripheral-coating and edge-illumination elements. Examples of this more-general situation include subject articles, such as the previously-described greeting cards or the subsequently-referenced dolls, where a subject panel is configured essentially as an appendange to an otherwise self-contained apparatus body-portion which does not in itself formally include the referenced definitional components but which still supplies the panel with subject illumination energy. In such more-general situations, a subject panel with its immediately-associated elements may then appropriately be regarded as conjunctively being another portion of the article's overall body. It may be further noted in this regard that the present invention body-portionately encompasses intermediate situations as well, as for example where an otherwise self-energized doll carries a portable, doll-energized radio which employs a subject panel. It may also be observed that a self-energized, subject-panel-inclusive portable radio, without regard to its being appended to some other invention-subject article, may, as appropriate, by itself constitute an invention-subject article. It is to be conjunctively noted that analogous appendage, body-portion, intermediate-encompassment and self-energized-article concepts apply to the optical fibers of the present and incorporated cases as well.

In contrast with previously-discussed embodiments having light-projective discontinuities of basically either lingustic or pictorial form, the subject discontinuities of panel 760 are as illustrated simply configured in a more-generalized decorative pattern 785. Pattern 785 may for example be formed into either or both of exterior panel surfaces 763 and 764, with a formation into some intermediate layer or surface also being possible.

As an example of a tree ornament which embodies a number of the combined panel-distributed-area and panel-point-aperture concepts of the embodiment of FIG. 2, FIG. 8 shows a top-mountable star 800. Star 800 includes body 810 composed in significant part of panel 860. In correspondence with principles previously discussed, panel 860 illuminates both central aperture 830 and the surrounding array of point apertures 840 formed in opaque boundary perimeter 825. The illustrated illumination of the point apertures is pointwise concentrated, while intraformed graphics pattern 885 and generalized surface roughening 888 are employed for the distributed-aperture display lighting. Illumination sources may for example be located at branch positions 812. Control and energization units are typically mounted within base section 815 which also includes stem receptacle 817. Also incorporatable into section 815 is subassembly 895 which may be any of a number of supplemental devices such as an audio pattern generator, possibly control-synchronized with illumination blink rates, or a switching device which is activated by sensed frequencies of either audio or other predetermined intervals.

In correspondence with the combined panel-distributed-area and fiber-point-aperture concepts of FIG. 6, the campaign button 900 of FIG. 9 employs panel 960 for the edge-lit illumination of distributed-area aperture 930, while utilizing the double-looped pair of optical fibers 951 and 952 for the arrow-indicated shifting-blink illumination of alternate sets of point apertures 940. Suitably-configured control and energization elements are again also included.

Figure 10A:
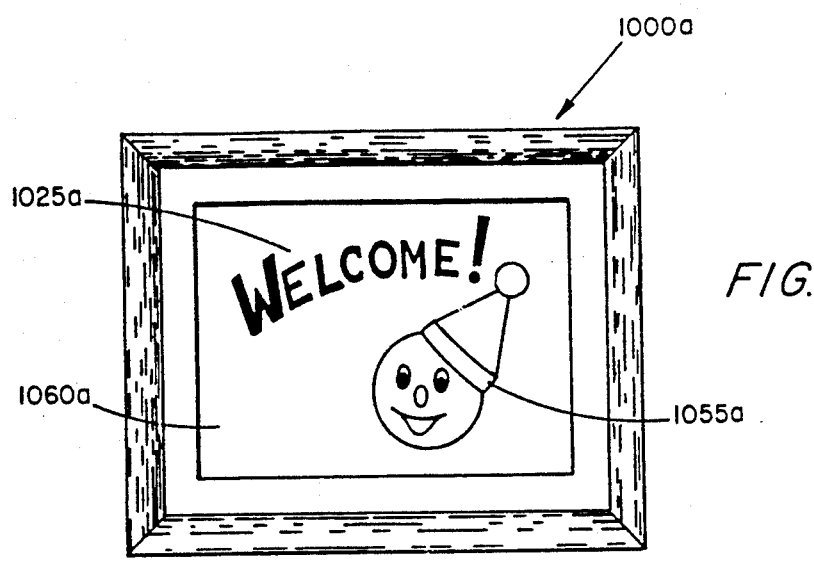
FIGS. 10a and 10b show picture-carrying plaques respectively inventively configured in accordance with the panel-distributed-area and alternative panel-distributed-and-point and panel-distributed and fiber-point concepts respectively illustrated in FIGS. 1 and 7, 2 and 8, and 6 and 9.

In correspondence with the panel-distributed-area concepts illustrated in the embodiments of FIGS. 1 and 7, the framed, autonomous plaque-type article 1000a in FIG. 10a includes edge-lit panel 1060a having linguistic discontinuity pattern 1085a. Panel 1060a also includes non-integrally-formed, display-decorative material 1055a, here configured as a cartoon-type character. Material 1055a may be either non-transparent or transparent. As with the supplemental materials previously discussed in conjunction with the embodiments of FIGS. 1 and 4d, material 1055a is typically adhesively carried on the front or back surface of a subject panel, although an encapsulation within the panel substrate itself is possible as well.

Figure 10B:
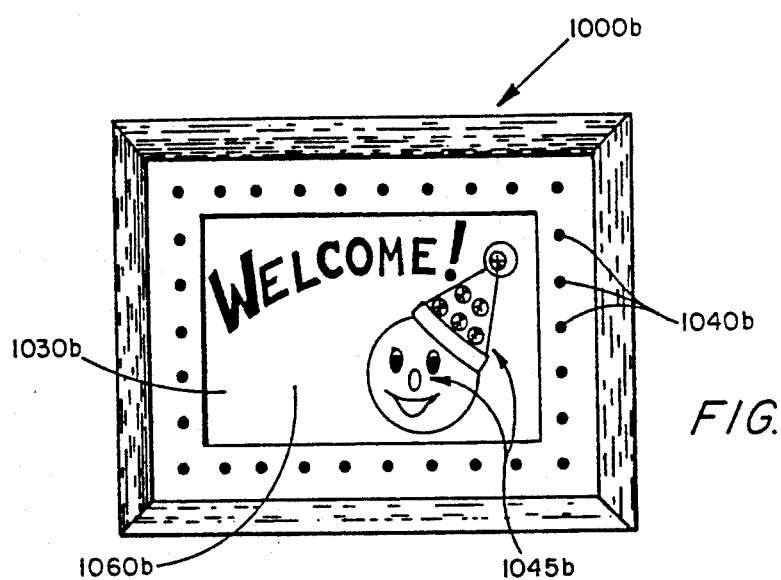

In analogous correspondence with the point-illumination concepts of the embodiments of either of the FIG.-sets 2 and 8 or 6 and 9, article 1000b in FIG. 10b employs a subject panel 1060b for distributed-area effects within aperture 1030b generally, while one or more subject pointwise-discontinuous panels or subject pointwise-discontinuous fibers are alternately or even conjunctively employed in addition for the illumination of point apertures 1040b. As an example furthermore of the intra-supplemental-image discontinuity highlighting previously discussed in conjunction with the embodiment of FIG. 4d, panel 1060b is also utilized for pointwise-concentrated effects within intra-character point apertures 1045b.

Figure 10C:
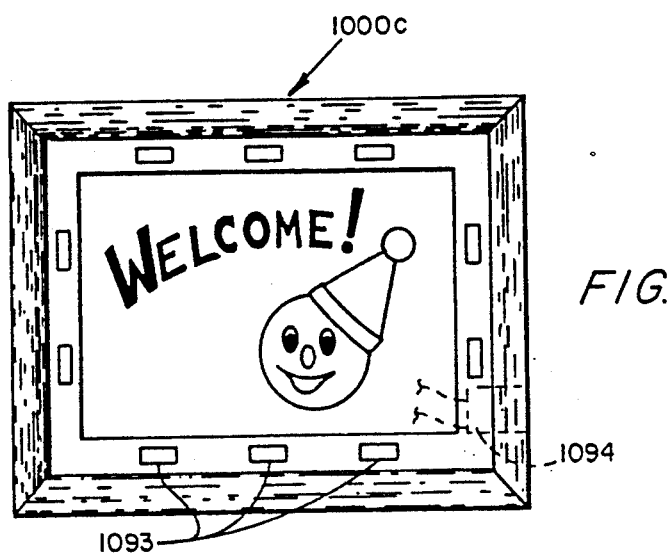
FIG. 10c shows another subject picture-carrying plaque, here configured for energization either by peripherally-distributed solar cells or by non-plaque-contained external power sources connected to an optional input receptacle.

FIG. 10c shows another subject picture-carrying plaque, here configured for typically-supplemental energization either by peripherally-distributed solar cells 1093 or by non-plaque-contained external power sources connected to an optional input receptacle 1094.

Energy generated by cells 1093 may for example either directly power plaque-associated illumination elements or instead operate to charge plaque-borne storage batteries. It may be here noted parenthetically that in correspondence with the previously-noted formal regarding of certain elements of the FIG.-1 embodiment as a card-body self-contained network for edge-illuminating the associated subject panel, so also may the cells in either of the direct-powering or battery-charging cases be more-formally regardable as a conjunctive portion of the analogous edge-illumination network of the present plaque 1000c.

Energy externally supplied to receptacle 1094 may similarly be employed for either direct-powering or battery-charging functions, with an operator-selective switching between such external-supply alternatives also being possible. In view of the typically-DC voltage requirements of subject edge-illumination elements, subject externally-supplied energy would typically itself be in DC form, from either actual-DC or transformed-AC sources. A plaque-borne AC-to-DC transformer for the appropriate conversion of externally-applied AC may be employed as well.

Figure 11A:
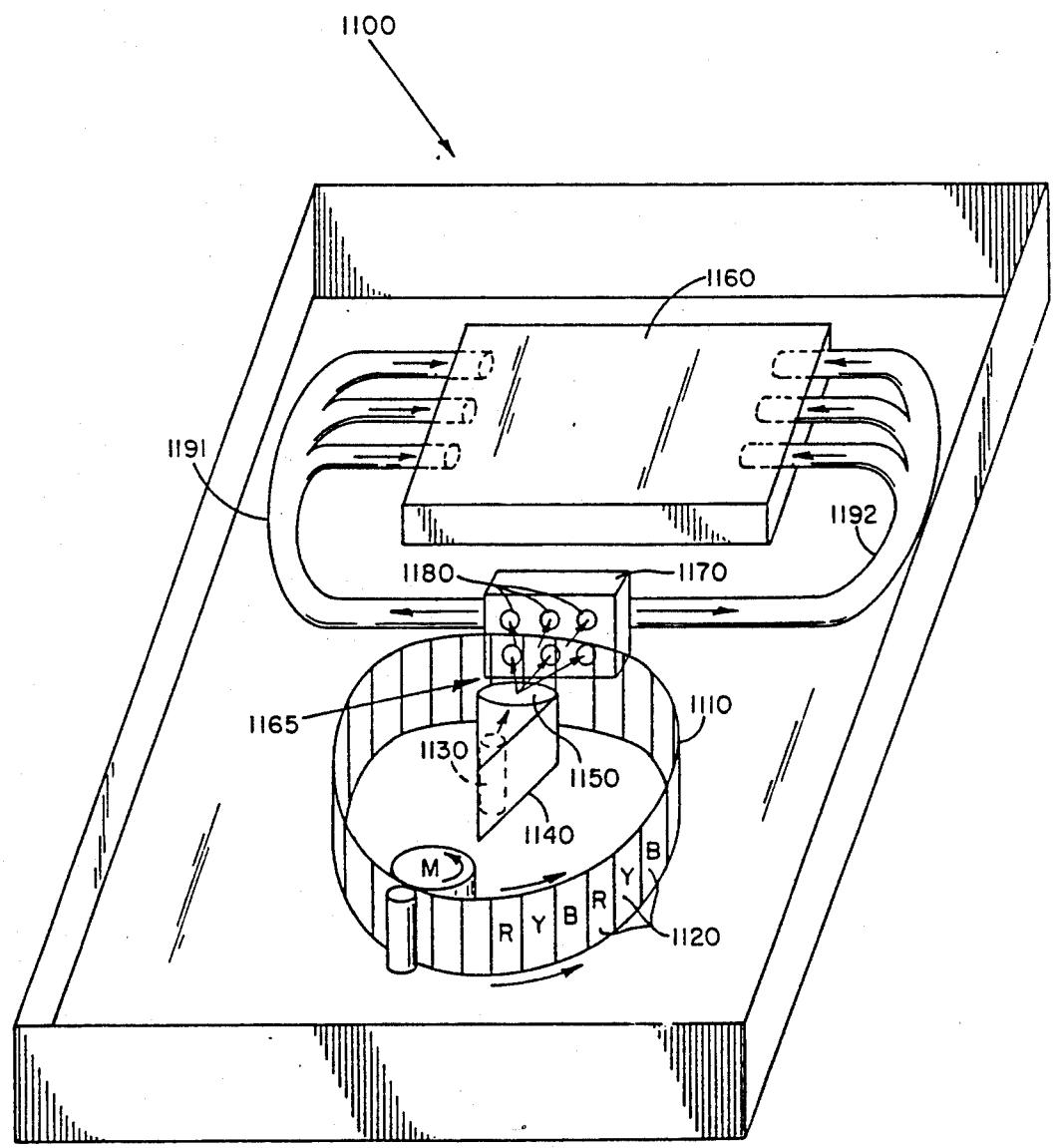
FIGS. 11a and 11b are complementary perspective representations of a rotating-color-ring subsystem for varying the color of the light injected into the panels and fibers of the present invention.
Figure 11B:
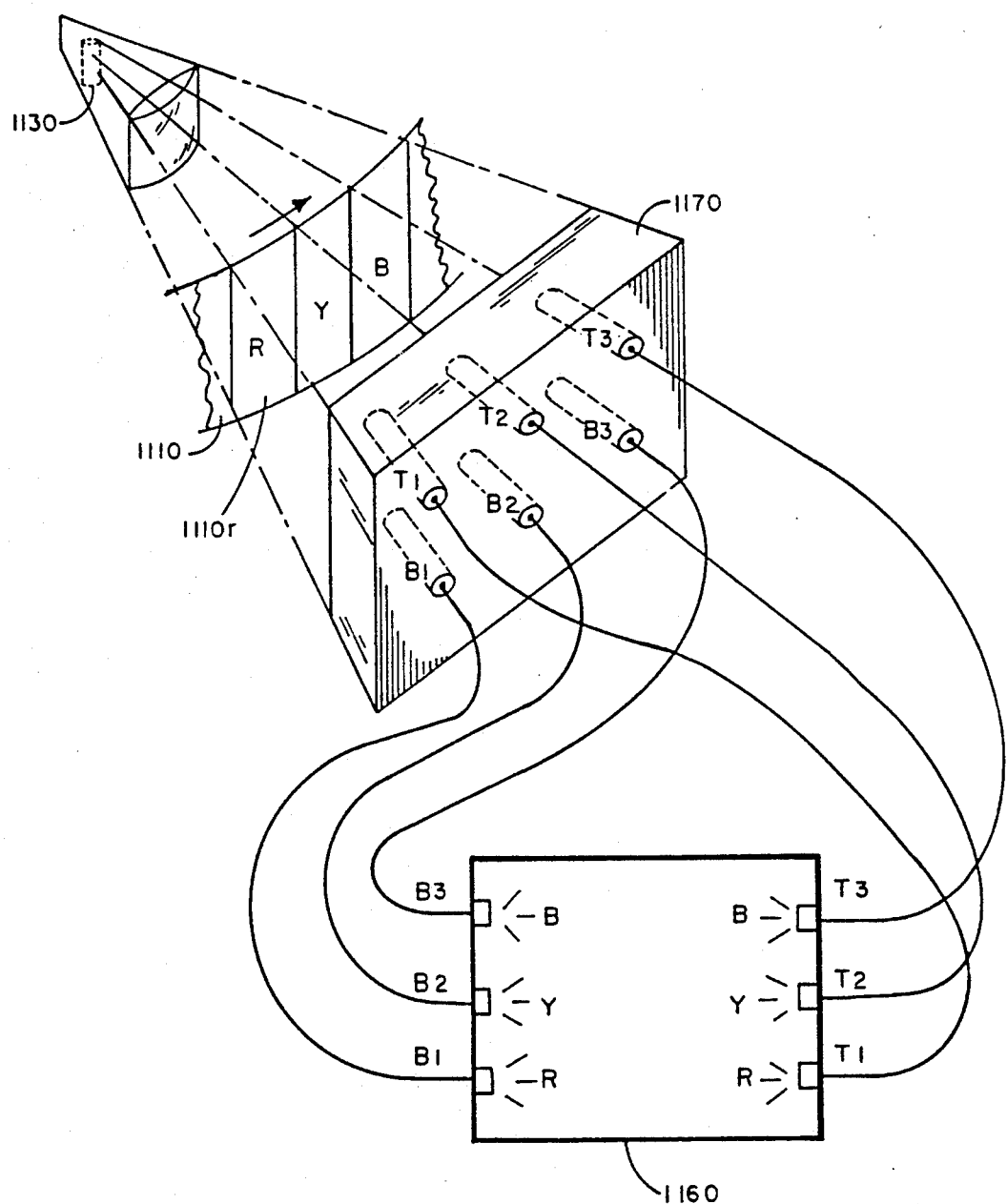

In those environments where increased article thickness is tolerable, an arrangement such as the one schematically illustrated in the opposing-perspective views of FIGS. 11a and 11b may be employed to vary the color of the light energy injected into subject panels of the present invention. It may be conjunctively be noted that an analogous arrangement may similarly be employed for varying the color of light analogously injected into subject point-discontinuous fibers.

Arrangement 1100 of FIG. 11a thus includes a rotatably-configured, light-transmissive ring 1110 of non-uniform coloration. Rotation is schematically effected by means of article-contained motor M. Non-uniform coloration within ring 1110 is conveniently realized by providing the ring with vertically-disposed facets 1120 of mutually-different coloration, such as three-facet sets of red, yellow and blue. Light energy from source 1130 is directed by suitably-configured reflector 1140 and lens 1150 so as to illuminate a sector 1165 of the circumference of revolution of ring 1110 which is interposed between the focused light source and reception block 1170. The resultantly color-varied light incident upon the optical-fiber ends 1180 is carried by fiber clusters 1191 and 1192 into the edges of panel 1160.

A portion of the FIG. 11a arrangement is presented in the enlarged, block-facing perspective view of FIG. 11b in which light energy from source 1130 is directed through the rotating color ring 1110 onto the input ends of the optical fibers mounted in reception block 1170. For the instant indicated in FIG. 11b, red light as filtered by example facet 1110r of the ring illuminates that portion of block 1170 in which are mounted the input ends of top fiber T1 and bottom fiber B1. The thusly-filtered light is schematically carried as indicated to opposite bottom portions of panel 1100, where it is apparent that panel orientation is relative within the different views. Similarly, yellow light incident upon top fiber T2 and bottom fiber B2 is carried to opposite middle portions of the panel, while top fiber T3 and bottom fiber B3 carry incident blue light to opposite top portions of the panel.

Several considerations with regard to the described color-variation scheme may now be noted. First, ring rotation is convenient but not essential, with a relative motion of a subject color filter in front of a subject light source or fiber-input area being sufficient. Secondly, subject point-discontinuous fibers such as those which embody the principles of FIG. 6 may be color-variationally driven by analogously mounting their input ends for subject illumination-section reception. Thirdly, different color patterns, different numbers of transfer fibers and different panel-input relationships may all be employed.

Figure 12:
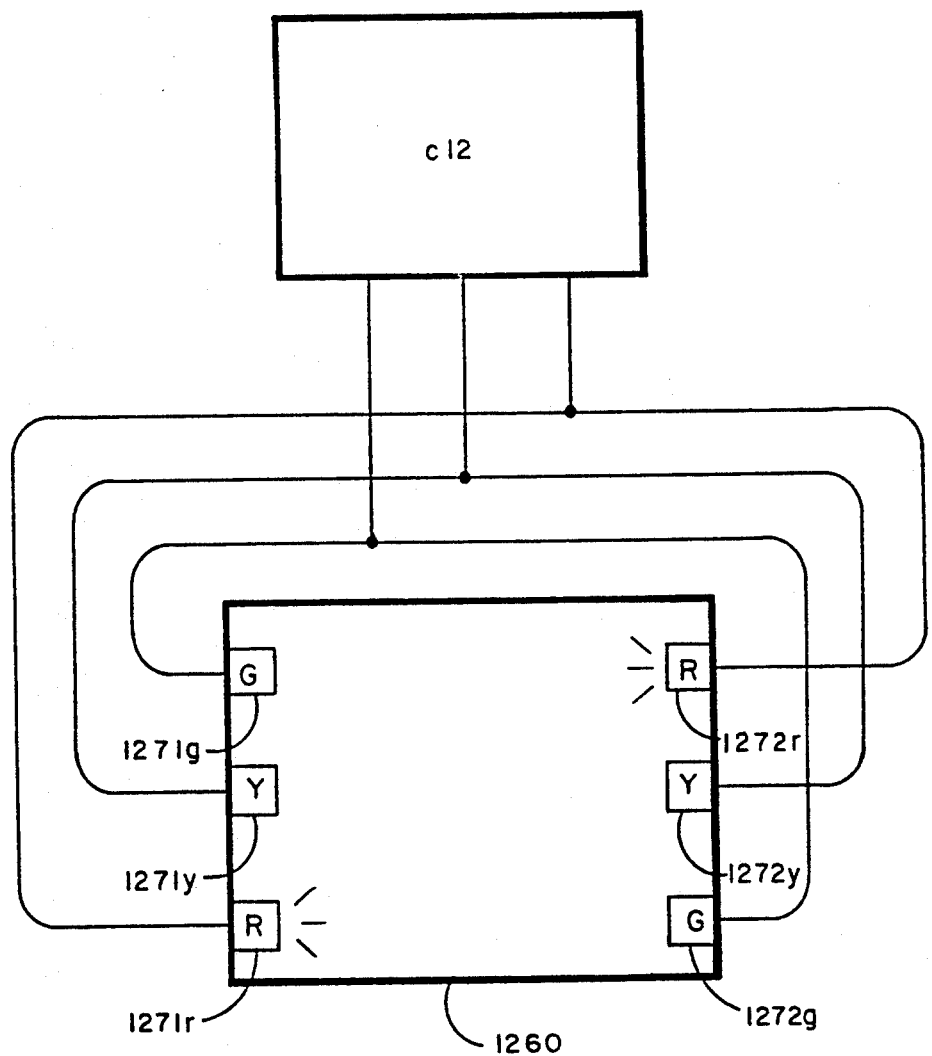
FIG. 12 represents another color-variation subsystem, here employing panel-edge-disposed light sources of mutually-different coloration, which are alternately energized under the direction of a sequenced control unit.

FIG. 12 represents another color-variation subsystem, here employing panel-edge-disposed light sources of mutually-different coloration, which are alternately energized under the direction of a sequenced control unit. Thus in contrast with the subsystem of FIGS. 11a and 11b where color-varying light is carried by optical fibers from off-panel light sources to the panel periphery, subject color sources 1271g, 1271y and 1271r and 1272r, 1272y and 1272g are here disposed within the edges of panel 1260 itself. Furthermore, the subject green, yellow and red sources are as indicated pair-wise distributed with balanced-illumination symmetry for improved intra-panel distribution of associated light coloration. Suitably-configured control unit C12 may for example then effect appropriate sequentially-alternated energization of the respective color-source pairs, thus producing as desired a variation in the viewed color of edge-injected panel illumination. Again readily-apparent are such other possible configurations as separate, non-paired activation of individual light sources and simulataneous activation of differently-colored light sources.

Figure 13:
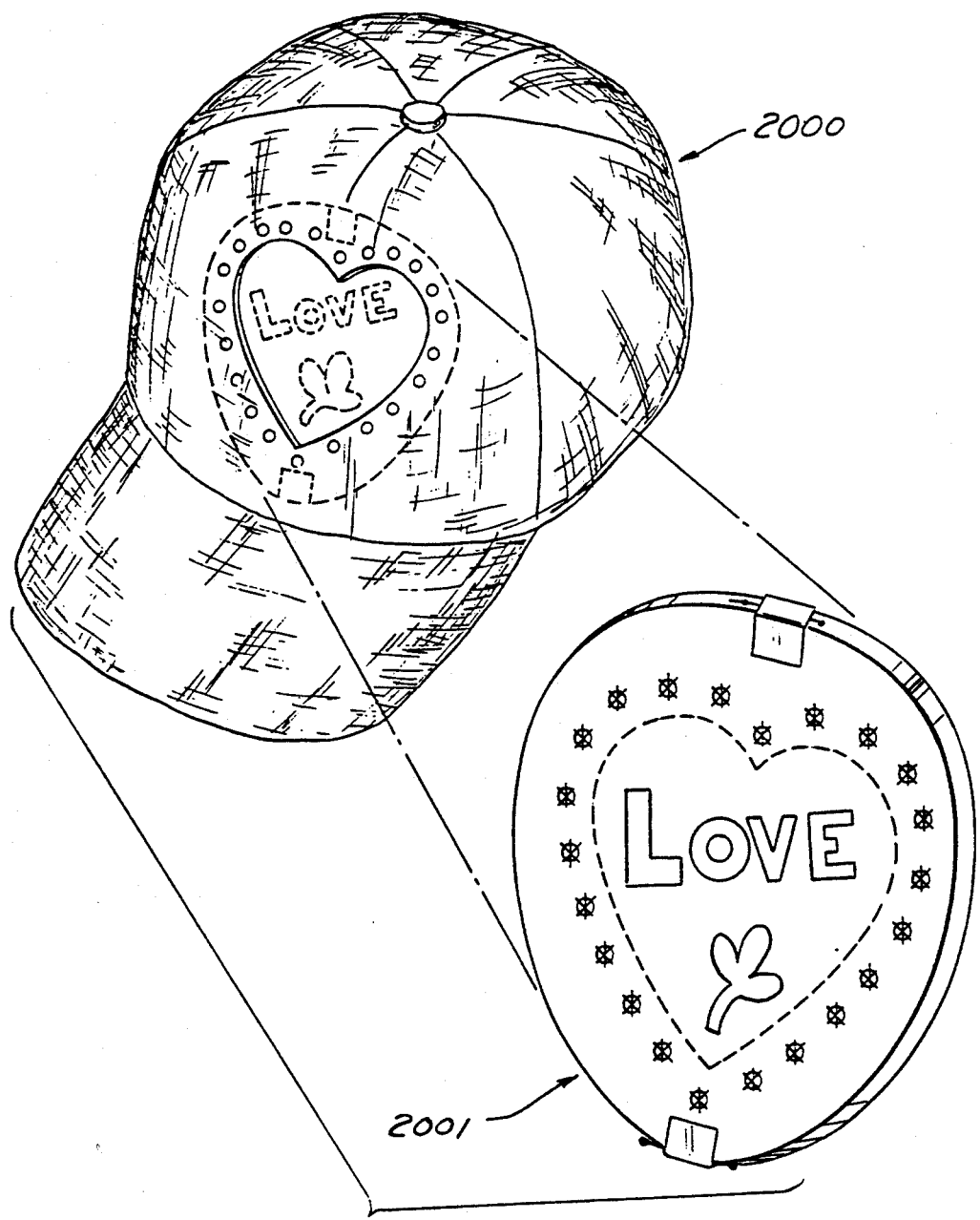
FIG. 13 is an exploded perspective view of an inventively configured hat having a distributed-area aperture illuminated by a hat-contained, edge-lit display panel which is driven by an also-contained, control-and-energization assembly.

FIG. 13 illustrates a hat 2000 to which an edge-illuminated panel 2001 is attached.

It may be noted parenthetically that the display surfaces of the various illustrated example embodiments may be regarded as body-intrinsic in that they operate to enhance the attractiveness of the basic article itself. It may more-generally be noted that the principles presented in all of the preceeding discussion may be combined into a great variety of additional types of articles, such as, but not limited to, toys, consumer electronic products, stationary, gift items, decorations, posters, general framed pictures, boxes, container devices, masks, pins, buttons, badges generally, labels, hats and headware, costumes, album covers, candle holders, ornaments, musical instruments, paper products, stuffed animals and other soft-sculptures, name-plates, dolls generally and signs, including those for advertizing, promotional and emergency or general-indication purposes.

The preceding description has presented in detail exemplary preferred ways in which the concepts of the present invention may be applied. Those skilled in the art will recognize that numerous alternatives encompassing many variations may readily be employed without departing from the spirit and scope of the invention as set forth in the appended claims, in which:

What is claimed is:
1. An illuminable hat comprising:
a hat body having a display surface;
an aperture formed in the display surface;
an edge-illuminable, essentially solid, internally light transmissive panel having an illuminable projection surface;
said panel positioned within the hat body and fixed behind the display surface;
said projection surface observable within the aperture upon illumination of the panel; and a means for edge illumination of the panel, said edge-illumination means being disposed within said body, wherein the panel contains an illuminable pattern observable within the aperture upon illumination of the panel.

2. A hat as defined in claim 1 wherein the pattern is a linguistic, pictorial, or symbolic representation.

3. An illuminable hat comprising:

a hat body having a display surface;

an aperture formed in the display surface;

an edge-illuminable, essentially solid, internally light transmissive panel having an illuminable projection surface;

said panel positioned within the hat body, and fixed behind the display surface;

said projection surface observable within the aperture upon illumination of the panel;

a means for edge-illumination of the panel, said edge-illumination means being completely disposed within said body; and said aperture comprising multiple apertures wherein at least one aperture is a point aperture.

4. The hat of claim 3 further comprising:

an optical fiber within the hat body, said fiber having an incision in the wall of the fiber, wherein the incision is positioned behind the display surface, observable within the point aperture, and associatedly aligned with the point aperture; and means for illumination of said optical fiber incision.

* * * * *

UNITED STATES PATENT AND TRADEMARK OFFICE
CERTIFICATE OF CORRECTION

PATENT NO. : 5,147,129
DATED : September 15, 1992
INVENTOR(S) : Min-ho Ku

It is certified that error appears in the above-indentified patent and that said Letters Patent is hereby corrected as shown below:

On the title page item [73], delete the words "Hong Kong" and insert --Whittier, California--.

Signed and Sealed this

Twenty-fifth Day of April, 1995

Attest:

BRUCE LEHMAN

Attesting Officer     Commissioner of Patents and Trademarks